United States Patent
Kim

(10) Patent No.: US 9,654,929 B2
(45) Date of Patent: May 16, 2017

(54) SYSTEM AND METHOD FOR PROVIDING NOTIFICATION BASED ON LOCATION DEVIATION

(71) Applicant: LINE Corporation, Shibuya-ku, Tokyo (JP)

(72) Inventor: Jihwan Kim, Seongnam-si (KR)

(73) Assignee: Line Corporation, Tokyo (JP)

( * ) Notice: Subject to any disclaimer, the term of this patent is extended or adjusted under 35 U.S.C. 154(b) by 0 days.

(21) Appl. No.: 15/191,677

(22) Filed: Jun. 24, 2016

(65) Prior Publication Data

US 2017/0070856 A1  Mar. 9, 2017

(30) Foreign Application Priority Data

Sep. 9, 2015 (KR) .................. 10-2015-0127909

(51) Int. Cl.
*H04W 4/18* (2009.01)
*H04W 4/02* (2009.01)
(Continued)

(52) U.S. Cl.
CPC ....... *H04W 4/023* (2013.01); *H04M 1/72572* (2013.01); *H04W 4/046* (2013.01); *H04W 4/12* (2013.01); *H04W 40/20* (2013.01)

(58) Field of Classification Search
CPC ........ G06F 17/30321; G06F 17/30882; H04W 4/008; H04W 40/125; H04W 4/02;
(Continued)

(56) References Cited

U.S. PATENT DOCUMENTS

2007/0162377 A1* 7/2007 Williams ............... G06Q 10/06
705/37
2013/0260893 A1 10/2013 Shin et al.
(Continued)

FOREIGN PATENT DOCUMENTS

KR    10-1056831    8/2011
KR    10-1301586    8/2013
(Continued)

OTHER PUBLICATIONS

Korean Office Action dated Mar. 22, 2017 for corresponding Korean Patent Application No. 10-2015-0127909.

*Primary Examiner* — Phuoc H Doan
(74) *Attorney, Agent, or Firm* — Harness, Dickey & Pierce, P.L.C.

(57) ABSTRACT

A server is configured to establish a communication session between electronic devices, receive first information about a time range and second information about a location range from a first electronic device, send third information to the first device, the third information being information about one or more users with whom a user of the first device establishes a human relationship, identify a user selected among the one or more users, store the first information and the second information in a database in connection with identifiers of the user and the identified user, monitor a location of at least one of the first device and a second device of the identified user based on the first and second information, and send, when one of the first or second device deviates from the location range, a notification message to the other one of the first or second device.

13 Claims, 10 Drawing Sheets

(51) Int. Cl.
*H04M 1/725* (2006.01)
*H04W 40/20* (2009.01)
*H04W 4/12* (2009.01)
*H04W 4/04* (2009.01)

(58) Field of Classification Search
CPC .... H04W 4/023; H04B 5/0062; H04M 7/006; H04L 29/06183; H04L 67/10; H04L 51/046; G06Q 50/30
USPC .......... 455/456.1, 456.3; 370/329, 252, 352; 709/207; 705/37; 707/795
See application file for complete search history.

(56) References Cited

U.S. PATENT DOCUMENTS

| | | |
|---|---|---|
| 2013/0332543 A1 | 12/2013 | Shin et al. |
| 2014/0019540 A1 | 1/2014 | Shin et al. |
| 2015/0324400 A1* | 11/2015 | Sheck ............... G06F 17/30312 707/795 |

FOREIGN PATENT DOCUMENTS

| | | |
|---|---|---|
| KR | 10-1440929 | 9/2014 |
| WO | WO-2015/065001 A1 | 5/2015 |

* cited by examiner

SYSTEM AND METHOD FOR PROVIDING NOTIFICATION BASED ON LOCATION DEVIATION

CROSS-REFERENCE TO RELATED APPLICATIONS

This application claims under 35 U.S.C. §119 priority to Korean Patent Application No. 10-2015-0127909 filed Sep. 9, 2015, in the Korean Intellectual Property Office, the entire contents of which are hereby incorporated by reference.

BACKGROUND

Example embodiments of the inventive concepts described herein relate to systems and/or methods for providing notification of a location deviation.

There are technologies that provide notification of a location deviation. For example, some conventional technologies periodically verify location information of a counterpart terminal and notify a user terminal that a counterpart deviates from a location on a schedule set by a user.

According to such technologies, the user accesses a separate service to register the counterpart and register information about the counterpart to verify a location deviation one by one. For example, the user separately accesses a site which provides a service, to join the site as a member, and inputs information about the counterpart using a user interface provided from the site. Thereafter, a server which provides the site requests the counterpart to concur with providing location information using the input information about the counterpart. If the counterpart is not a member of the service provided from the site, the counterpart accesses the site, joins the site as a member, and agrees to provide the location information.

Also, in the process of requesting the counterpart to agree to provide the location information, the server explains the user to the counterpart. In other words, the server allows the counterpart to recognize whether to provide or not provide location information to one or more other users.

In the related art, only deviation from a specific place such as a location on a schedule may be detected. Deviation from various location ranges set based on various conditions may not be detected. For example, in the related art, it may be detected that the counterpart deviates from his or her school. However, it may not be detected or verified whether the counterpart deviates from a route range from his or her school to his or her home.

Further, in the related art, it may be detected whether the counterpart deviates from a location set by the user. However, when the user deviates from the location set by the user, there is no method of informing another user that the user deviates from the location set by the user.

SUMMARY

In one example embodiment, a server includes a memory configured to store computer-readable instructions and at least one processor. The at least one processor is configured to execute the computer-readable instructions to establish a communication session for routing messages between electronic devices and for managing human relationship information between users of the electronic devices, receive first information about a time range and second information about a location range from a first electronic device among the electronic devices, and send third information to the first electronic device based on the human relationship information, the third information being information about one or more users with whom a user of the first electronic device establishes a human relationship. The at least one processor is further configured to execute the computer-readable instructions to identify, from the first electronic device, a user selected among the one or more users, store the first information and the second information in a database in connection with an identifier of the user of the first electronic device and an identifier of the identified user, monitor a location of at least one of the first electronic device and a second electronic device of the identified user based on the first and second information stored in the database, and send, when one of the first electronic device or the second electronic device deviates from the location range at a time corresponding to the time range, a notification message to the other one of the first electronic device or the second electronic device through the communication session based on the monitored location.

In yet another example embodiment, the location range is a range set on a map, based on an input of the user of the first electronic device on the map displayed on a screen of the first electronic device.

In yet another example embodiment the screen of the first electronic device is a touch screen; and the range set on the map is set through a touch gesture of the user on the touch screen.

In yet another example embodiment, the location range includes at least one route between a source and a destination set in the first electronic device.

In yet another example embodiment, the location range includes a route of a vehicle selected in the first electronic device.

In yet another example embodiment, the location range includes a first location range and a second location range; and the at least one processor is configured to determine whether the one of the first electronic device or the second electronic device deviates from the first location range at the time corresponding to the time range and moves into the second location range, and send the notification message to the other one of the first electronic device or the second electronic device, if it is determined that the one of the first electronic device or the second electronic device does not move into the second location range.

In an example embodiment, a method includes establishing, by a first electronic device, a communication session for communicating a message with one or more other electronic devices, providing, by the first electronic device, a user interface for receiving a time range and a location range, generating, by the first electronic device, first information about the time range and second information about the location range based on information input through the user interface, and receiving, by the first electronic device, information about one or more users with whom a user of the first electronic device establishes a human relationship. The method further includes identifying, by the first electronic device, a user selected based on an input of the user of the first electronic device among the one or more users, sending, by the first electronic device, the first information, the second information, and third information about the identified user to the server, storing, in the server, the first and second information in connection with an identifier of the user of the first electronic device and an identifier of the identified user, monitoring, by the server, a location of at least one of the first electronic device and a second electronic device of the identified user based on the first and second information stored in the database; and sending, by the server, a notification message to one of the first electronic device or the second electronic device through the communication session, when the other one of the first electronic device or the second electronic device deviates from the location range at a time corresponding to the time range.

In yet another example embodiment, the user interface includes a map on a screen of the first electronic device and the generating generates the first information based on a range set on the map according to an input of the user of the first electronic device on the map.

In yet another example embodiment, the screen of the first electronic device is a touch screen and the generating the first information includes recognizing the range set through a touch gesture of the user of the first electronic device on the touch screen.

In yet another example embodiment, the user interface enables the user of the first electronic device to set a source and a destination and the generating generates the first information based on at least one route between the source and the destination.

In yet another example embodiment, the user interface enables the user of the first electronic device to select a route for each vehicle and the generating generates the first information based on the route of each vehicle selected through the user interface.

In yet another example embodiment, the location range includes a first location range and a second location range and the sending the notification message comprises sending the notification message to the one of the first electronic device and the second electronic device if it is determined that the other one of the first electronic device or the second electronic device, which deviates from the first location range at a time corresponding to the time range, does not move to the second location range.

In one example embodiment, a non-transitory computer-readable recording medium storing computer-readable instructions, which when executed by a processor, cause the processor to establish a communication session for communicating a message with one or more other electronic devices, provide a user interface for receiving a time range and a location range, generate first information about the time range and second information about the location range based on information input through the user interface, receive information about one or more users with whom a user of the first electronic device establishes a human relationship, identify a user selected based on an input of the user of the first electronic device among the one or more users, sending, by the first electronic device, the first information, the second information, and third information about the identified user to the server, store the first and second information in connection with an identifier of the user of the first electronic device and an identifier of the identified user, monitor a location of at least one of the first electronic device and a second electronic device of the identified user based on the first and second information stored in the database, and send a notification message to one of the first electronic device or the second electronic device through the communication session, when the other one of the first electronic device or the second electronic device deviates from the location range at a time corresponding to the time range.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF EXAMPLE EMBODIMENTS

Figure 1:
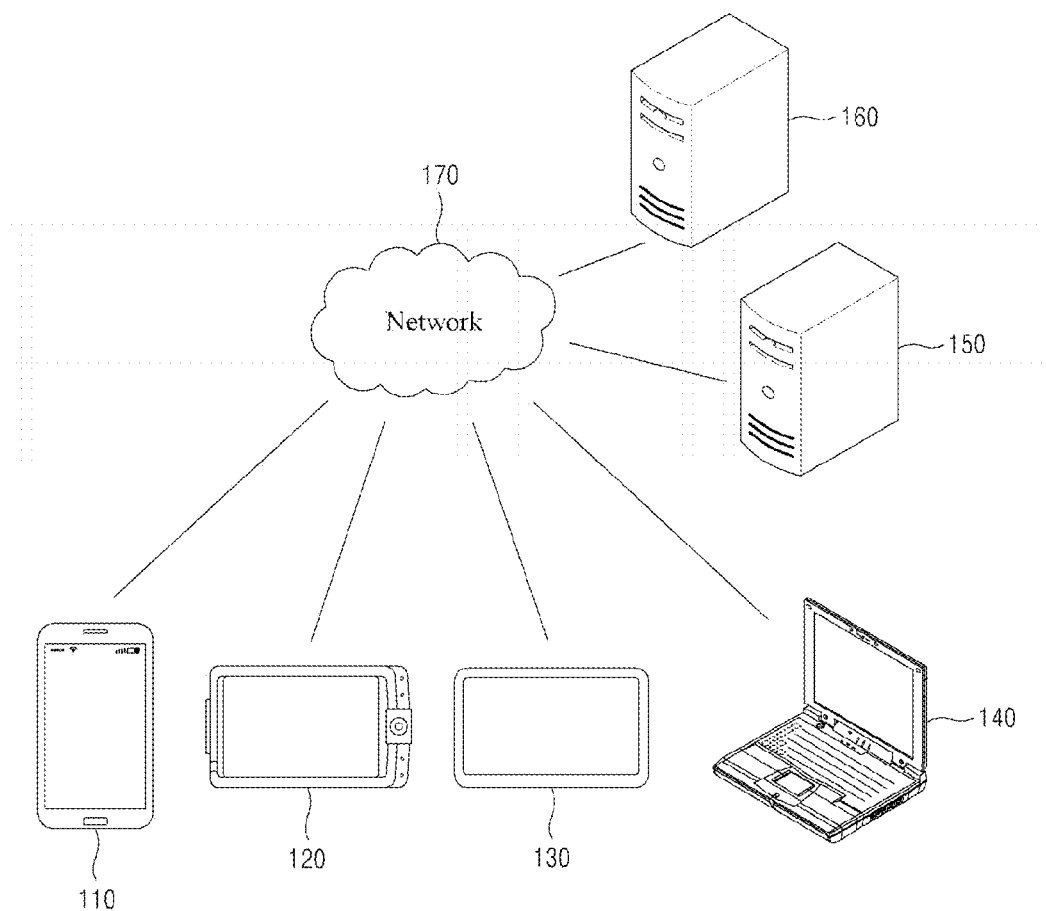
FIG. 1 is a drawing illustrating a network environment according to an example embodiment of the inventive concepts.

Example embodiments will be described in detail with reference to the accompanying drawings. The inventive concepts, however, may be embodied in various different forms, and should not be construed as being limited only to the illustrated example embodiments. Rather, these example embodiments are provided as examples so that this disclosure will be thorough and complete, and will fully convey the inventive concepts to those skilled in the art. Accordingly, known processes, elements, and techniques are not described with respect to some of the example embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s)

as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular Example embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Thus, for example, both "at least one of (or one of) A, B, or C" and "A, B, and/or C" means either A, B, C or any combination thereof. Also, the term "example" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belong. It will be further understood that terms, such as those defined in commonly used dictionaries, should be interpreted as having a meaning that is consistent with their meaning in the context of the relevant art and/or the present disclosure and will not be interpreted in an idealized or overly formal sense unless expressly so defined herein.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, a description will be given in detail for some example embodiments of the inventive concepts with reference to the accompanying drawings. However, the inventive concepts are not limited by the example embodiments. Also, with respect to the descriptions of the drawings, like reference numerals refer to like elements.

FIG. 1 is a drawing illustrating a network environment according to an example embodiment of the inventive concepts. As illustrated, the network environment of FIG. 1 may include a plurality of electronic devices 110 to 140, a plurality of servers 150 and 160, and a network 170. However, the number of electronic devices and the number of servers may not be limited thereto.

Each of the electronic devices 110 to 140 may be a fixed (e.g., immobile) terminal or a mobile terminal implemented with a computer device. For example, the plurality of electronic devices 110 to 140 may be a smart phone, a mobile phone, a navigation device, a computer, a notebook, a digital broadcasting terminal, a personal digital assistant (PDA), a portable multimedia player (PMP), a tablet personal computer (PC), and the like. For example, the electronic device 110 may communicate with the other electronic devices 120 to 140 and/or the servers 150 and 160 through the network 170 using a wired and/or wireless communication scheme.

The scope and sprit of the inventive concepts may not be limited to a specific communication scheme. For example, a communication scheme using a local area wireless communication network between devices as well as a communication scheme using a communication network (e.g., a mobile communication network, a wired internet, a wireless internet, and a broadcasting network) may be included in the network 170. For example, the network 170 may include one or more of networks, such as a personal area network (PAN), a local area network (LAN), a campus area network (CAN), a metropolitan area network (MAN), a wide area network (WAN), a broadband network (BBN), and the Internet. Also, the network 170 may include, but is limited to, one or more of network topologies which include a bus network, a star network, a ring network, a mesh network, a star-bus network, a tree or hierarchical network, and the like.

Each of the servers 150 and 160 may be implemented with a computer device or a plurality of computer devices which may communicate with the plurality of electronic devices 110 to 140 through the network 170 to provide an instruction, a code, a file, content, a service, and the like to the plurality of electronic devices 110 to 140.

For example, the server 160 may provide to the electronic device 110 a file for installing an application through the network 170. In this case, the electronic device 110 may install the application using the file provided from the server 160. Also, the electronic device 110 may connect to the server 150 under control of an operating system (OS) and at least one program (e.g., a browser or the installed application) included in the electronic device 110 and may receive a service and/or content provided from the server 150. For one example, if the electronic device 110 sends a service request message to the server 150 through the network 170 under control of the application, the server 150 may send a code corresponding to the service request message to the electronic device 110. The electronic device 110 may configure and display a screen corresponding to the code to provide content to its user. For another example, the server 150 may establish a communication session for a messaging service and may route a message between the plurality of electronic devices 110 to 140 through the established communication session.

Figure 2:
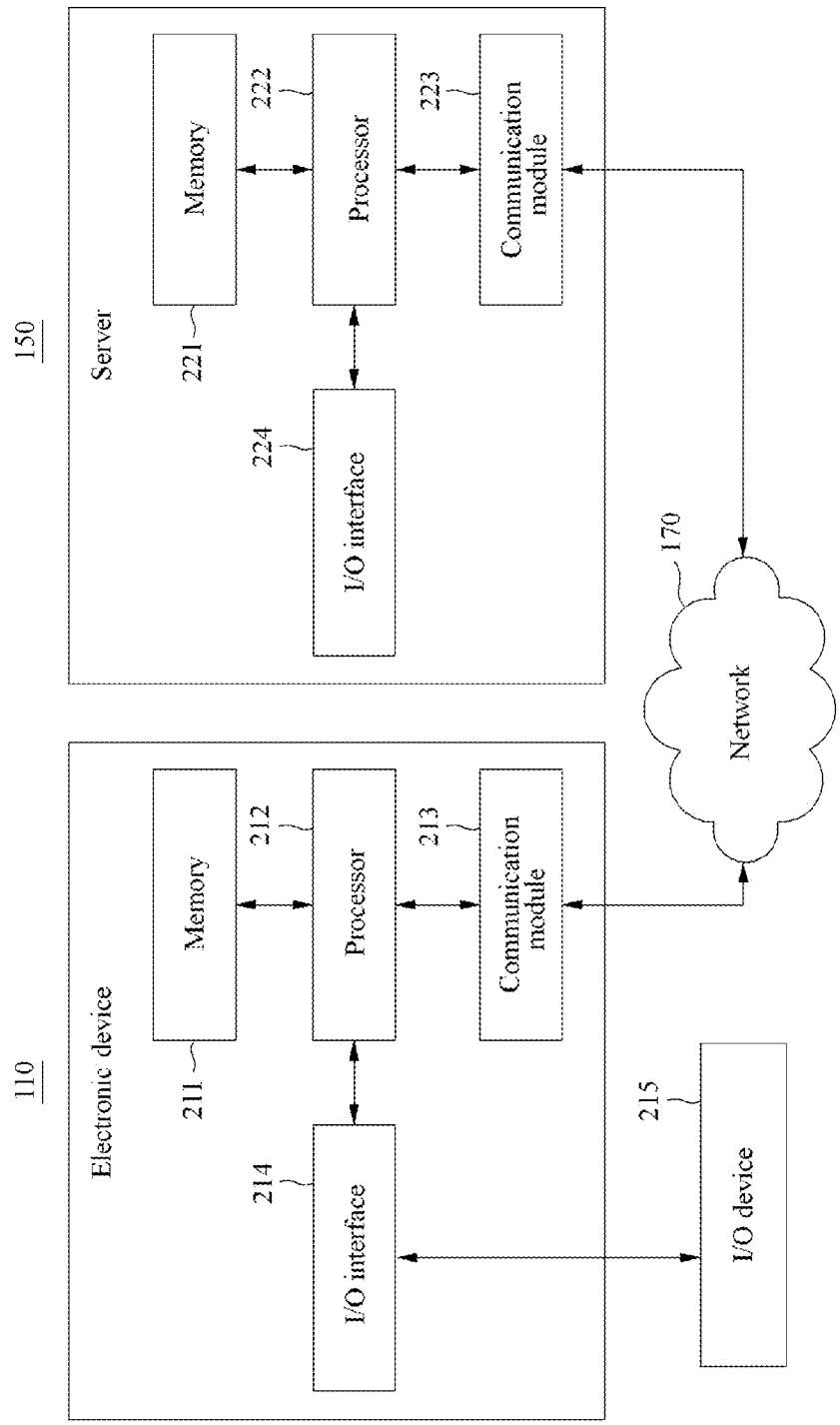
FIG. 2 is a block diagram illustrating a configuration of an electronic device and a configuration of a server in an example embodiment of the inventive concepts.

FIG. 2 is a block diagram illustrating a configuration of an electronic device and a configuration of a server in an example embodiment of the inventive concepts. In FIG. 2, an electronic device 110 of FIG. 1 is illustrated as an example of an electronic device and a server 150 of FIG. 1 is illustrated as an example of a server. Components of the electronic device 110 may be the same or similar to those of each of the other electronic devices 120 to 140 of FIG. 1, and components of the server 150 may be the same or similar to those of the other server 160 of FIG. 1.

The electronic device 110 may include a memory 211, a processor 212, a communication module 213, and an input and output interface 214. The server 150 may include a memory 221, a processor 222, a communication module 223, and an input and output interface 224. Each of the memories 211 and 221 may be a computer-readable recording medium and may include a permanent mass storage device such as a random access memory (RAM), a read only memory (ROM), and a disc drive. Also, the memory 211 may store an OS and/or at least one program code (e.g., a code for a browser or application installed and driven in the electronic device 110). The memory 221 may store an OS and/or at least one program code. These software components may be loaded from a computer-readable recording medium, which is independent of the memories 211 and 221, using a drive mechanism. This computer-readable recording medium may include computer-readable recording media such as a floppy drive, a disc, a tape, a digital versatile disc/compact disc-ROM (DVD/CD-ROM) drive, and a memory card. In another example embodiment, software components may be loaded into the memories 211 and 221 through the communication modules 213 and 223, respectively, rather than a computer-readable recording medium. For example, at least one program may be loaded into each of the memories 211 and 221 based on a program (e.g., the above-mentioned application) installed by files provided by developers or a file distribution system (e.g., the above-mentioned server 160), which distributes a file for installing an application, through the network 170.

Each of the processors 212 and 222 may be configured to process an instruction of a computer program by performing basic arithmetic, logic, and/or input and output operations. The instruction may be provided to the processor 212 by the memory 211 or the communication module 213. The instruction may be provided to the processor 222 by the memory 221 or the communication module 223. For example, each of the processor 212 and 222 may be configured to execute an instruction received based on a program code stored in a storage device such as the memories 211 and 221.

Each of the communication modules 213 and 223 may provide a function such that the electronic device 110 and the server 150 communicate with each other through the network 170. Each of communication modules included in another electronic device 120 and another server 160 may provide a function such that the electronic device 120 and the server 160 communicate with each other through the network 170. For example, a request (e.g., a streaming service request for content) generated by the processor 212 of the electronic device 110 based on a program code stored in a recording device such as the memory 211 may be transmitted to the server 150 through the network 170 under control of the communication module 213. For example, a control signal or instruction, content, a file, and the like provided under control of the processor 222 of the server 150 may be received in the electronic device 110 through the communication module 213 of the electronic device 110, through the communication module 223, and the network 170. For example, the control signal or instruction of the server 150, received through the communication module 213, may be sent to the processor 212 and/or the memory 211. The content or file of the server 150 may be stored in a storage medium which may be further included in the electronic device 110.

The input and output interface 214 may interfere with the input and output device 215. For one example, the input device may include devices such as a mouse and a keyboard. The output device may include a display for displaying a communication session of an application. For another example, the input and output interface 214 may interface with a device, such as a touch screen, in which an input function and an output function are integrated into one. For example, in processing an instruction of a computer program loaded into the memory 211, the processor 212 of the electronic device 110 may display a service screen and/or content, which is configured using data provided from the server 150 or the electronic device 120, on a display of the electronic device 110 through the input and output interface 214.

Also, in other example embodiments, the electronic device 110 may include more components than those shown in FIG. 2. The server 150 may include more components than those shown in FIG. 2. However, descriptions of such additional components are omitted for brevity. For example, the electronic device 110 may be implemented to include some of components of the above-mentioned input and output device 215 or may further include other components (e.g., a transceiver, a global positioning system (GPS) module, a camera, various sensors, and/or a database).

Figure 3:
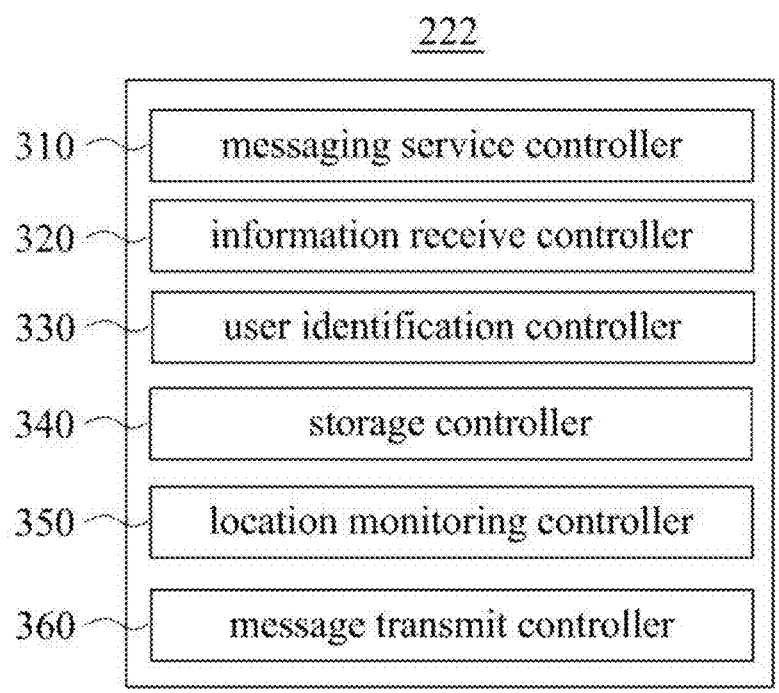
FIG. 3 is a block diagram illustrating a detailed configuration of a processor of a server according to an example embodiment of the inventive concepts.
Figure 4:
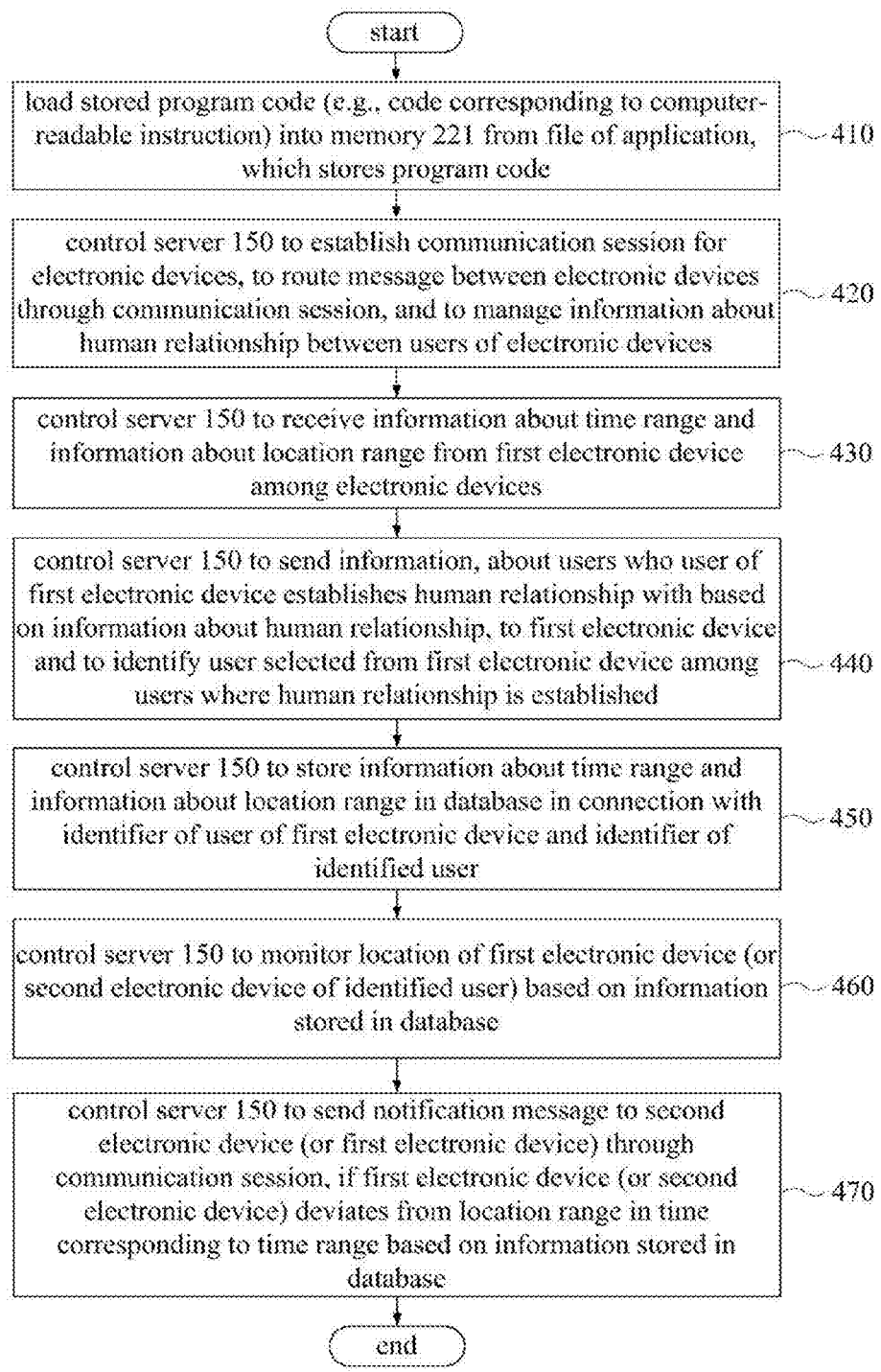
FIG. 4 is a flowchart illustrating a method performed by a server according to an example embodiment of the inventive concepts.

FIG. 3 is a block diagram illustrating a detailed configuration of a processor of a server according to an example embodiment of the inventive concepts. FIG. 4 is a flowchart illustrating a method performed by a server according to an example embodiment of the inventive concepts. As shown in FIG. 3, a processor 222 of a server 150 of FIG. 2 may include a messaging service controller 310, an information receive controller 320, a user identification controller 330, a storage controller 340, a location monitoring controller 350, and a message transmit controller 360. These components of the processor 222 may control the server 150 to perform steps 410 to 470 included in a method of FIG. 4 by execute an OS and/or at least one program code, included in a memory 221 of FIG. 2.

In step 410, the processor 222 may load a stored program code (e.g., a code corresponding to a computer-readable instruction) into the memory 221 from a file for installing an application, which stores the program code for performing the method of FIG. 4. For example, the application may be installed in the server 150 using the file for installing the application. If the application installed in the server 150 is driven, the processor 222 may load the program code stored in the file into the memory 221. In this case, each of the messaging service controller 310, the information receive controller 320, the user identification controller 330, the storage controller 340, the location monitoring controller 350, and the message transmit controller 360 included in the processor 222 may be execute a corresponding portion of the program code loaded into the memory 221 to execute subsequent steps 420 to 470. Thereafter, the processor 222 may control the server 150 by controlling the other components of the server 150. For example, the processor 222 may control the communication module 223 included in the server 150 to control the server 150 such that the server 150 communicates data with the other server 160 and/or the electronic devices 110 to 140.

In step 420, the messaging service controller 310 may control the server 150 to establish a communication session for electronic devices for routing a message between the electronic devices through the communication session and for managing information about a human relationship between users of the electronic devices. For example, the communication session may correspond to a chat room of a messaging service, and the human relationship may correspond to a friend relationship in the messaging service. In this case, the messaging service controller 310 may control the server 150 to manage the friend relationship in the messaging service, to generate a chat room, and/or to manage message communication in the generated chat room.

In step 430, the information receive controller 320 may control the server 150 to receive information (first information) about a time range and information (second information) about a location range from, for example, a first electronic device among electronic devices. For example, the first electronic device may provide an interface for setting a time range and a location range through an application associated with a messaging service. If a user of the first electronic device sets a time range and/or a location range in various ways using the user interface, the first electronic device may send the information about the set time range and the information about the set location range to the server 150 under control of the application. In this case, the information receive controller 320 may control the server 150 to receive information sent from the first electronic device.

In step 440, the user identification controller 330 may control the server 150 to send information about one or more users with whom the user of the first electronic device establishes a human relationship based on the information about the human relationship to the first electronic device and identify from the first electronic device a user selected among the one or more users with whom the human relationship is established. Therefore, the user of the first electronic device may easily select a specific user among the one or more users with whom a human relationship is established and may receive a service, without joining a separate service or inputting information, for locating a specific user, one by one in the separate service. Instead, the selected user may easily determine that he or she receives a service together with the user of the first electronic device, with whom a human relationship is established through a messaging service, and may receive the service without joining the separate service.

In step 450, the storage controller 340 may control the server 150 to store the information about the time range and the information about the location range in a database in connection with an identifier of the user of the first electronic device and an identifier of the identified user. The database may be implemented to be included in the server 150. In some example embodiments, the database may be implemented to be included in a system independent of the server 150. The server 150 may access the database through communication between the server 150 and the system independent of the server 150. The server 150 may determine the user of the first electronic device, who sets the time range and the location range, and a user of a second electronic device, selected by the user of the first electronic device, through information stored in the database.

In step 460, the location monitoring controller 350 may control the server 150 to monitor a location of, for example, one of the first electronic device or the second electronic device of the identified user based on information stored in the database. For example, an application associated with the server 150 may be installed in the first electronic device. The first electronic device may periodically transmit current GPS coordinates as current location under control of the application, to the server 150. In this case, the server 150 may obtain the location of the first electronic device periodically. Then, the location monitoring controller 350 may monitor the location of the first electronic device using the periodically obtained location. Similarly, the location monitoring controller 350 may monitor the location of the second electronic device In step 470, if the one of the first electronic device or the second electronic device deviates from the location range in a time corresponding to the time range, the message transmit controller 360 may control the server 150 to send a notification message to the other of the first electronic device or the second electronic device through the communication session based on information stored in the database. For example, the message transmit controller 360 may compare the periodically obtained location of the first electronic device with the location range periodically. If the location of the first electronic device is not include in the location range, the message transmit controller 360 may determine that the first electronic device is deviated from the location range.

For one example, the location monitoring controller 350 may monitor a location of the first electronic device and may determine whether the first electronic device deviates from the location range in a time corresponding to the time range. In this case, if it is determined that the first electronic device deviates from the location range, the message transmit controller 360 may send a notification message to the second electronic device through the communication session. For example, if the first electronic device deviates from a normal location range, the user of the first electronic device could be in an emergency situation such as kidnapping. Thus, the message transmit controller 360 may automatically send a notification message to a friend of the user of the first electronic device.

For another example, the location monitoring controller 350 may monitor a location of the second electronic device and may determine whether the second electronic device deviates from the location range in a time corresponding to the time range. In this case, if it is determined that the second electronic device deviates from the location range, the message transmit controller 360 may send a notification message to the first electronic device through the communication session. Thus, the user of the first electronic device may know whether the user of the second electronic device specified by the user of the first electronic device deviates from the location range within the time range set by the user of the first electronic device.

As such, according to an example embodiment of the inventive concepts, users may easily and simply set a notification function based on a location deviation using a function of a messaging service. A location deviation of the second user (or second users) selected by the first user may be informed to the first user using information about a human relationship of the messaging service. Also, if the user deviates from a location or a location range set by him or her, his or her risk may be mitigated or prevented by informing another user, with whom the user establishes a human relationship that the user deviates from the location or the location range.

Hereinafter, a description will be given of various methods of setting a location range.

In an example embodiment, the first electronic device may provide a user interface, for setting a location range, to the user of the first electronic device under control of an application driven in the first electronic device. In this case, the first electronic device may display a map image on its screen. The user of the first electronic device may set a desired range on the map image through the provided user interface. In this case, the location range may include a range set on the map image, which is displayed on the screen of the first electronic device, based on the input of the user of the first electronic device on the map image. For one example, the user interface may include a drawing tool for drawing a boundary of a location range on a map image. For another example, the screen of the first electronic device may include a touch screen. The range set on the map image may include a range set through a touch gesture of the user on the touch screen. If the user draws a circle through a touch and drag event on the map image, information about a location range corresponding the circle may be generated. As such, the user may set various ranges he or she wants on the map image.

Figure 5:
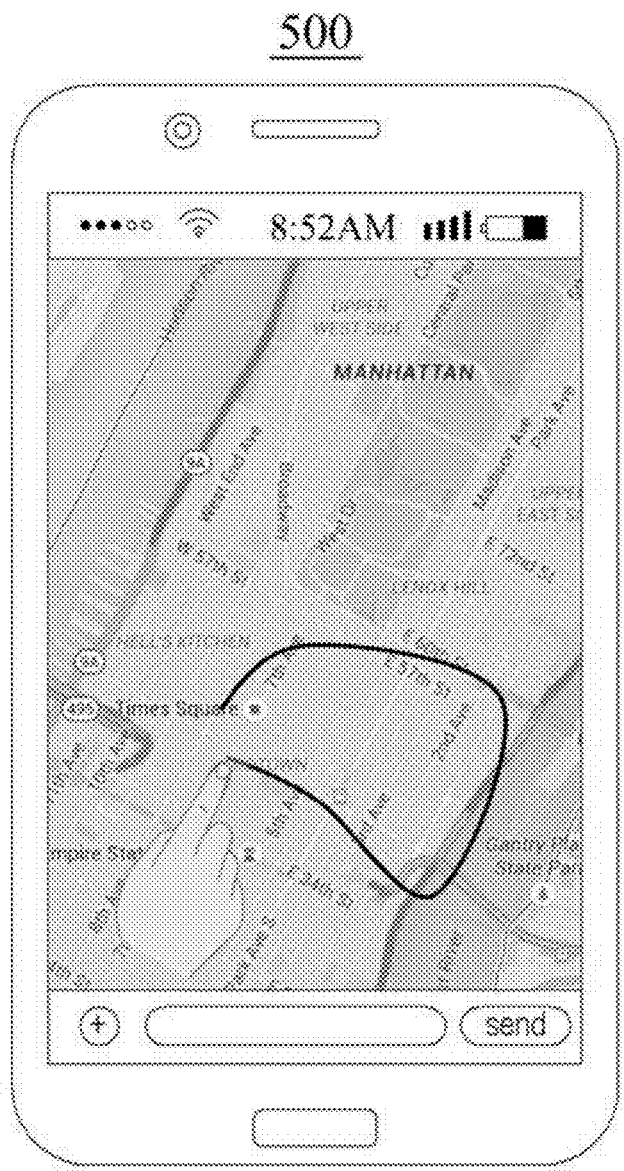
FIG. 5 is a screen illustrating a process of setting a location range using a map image in an example embodiment of the inventive concepts.

FIG. 5 is a screen illustrating a process of setting a location range using a map image in an example embodiment of the inventive concepts. A screen 500 of FIG. 5 illustrates that a user of a first electronic device draws a line using a touch and drag gesture on a map image displayed on, for example, a touch screen of the first electronic device. In this case, if one range is set through the drawn line, a range on the map image corresponding to the range may be set as a location range. For example, the first electronic device may display a map image of a location set by the user on the touch screen under control of an application. Further, the first electronic device may display a line on the map image based on a coordinate input through the touch screen, may determine whether one range is set through the line, and may set a location range using the one set range and a corresponding location (e.g., a global positioning system (GPS) coordinate) on the map image.

A server 150 of FIG. 2 may monitor a location of the first electronic device (or a second electronic device). If the first electronic device (or the second electronic device) deviates from the set location range, the server 150 may send a notification message to the second electronic device (or the first electronic device).

In another example embodiment for setting a location range, the location range may include a location range for at least one route between a source and a destination set in the first electronic device. For this purpose, the first electronic device may provide a user interface for setting the source and the destination and may generate information about the location range for the at least one route between the source and the destination set through the user interface.

Figure 6:
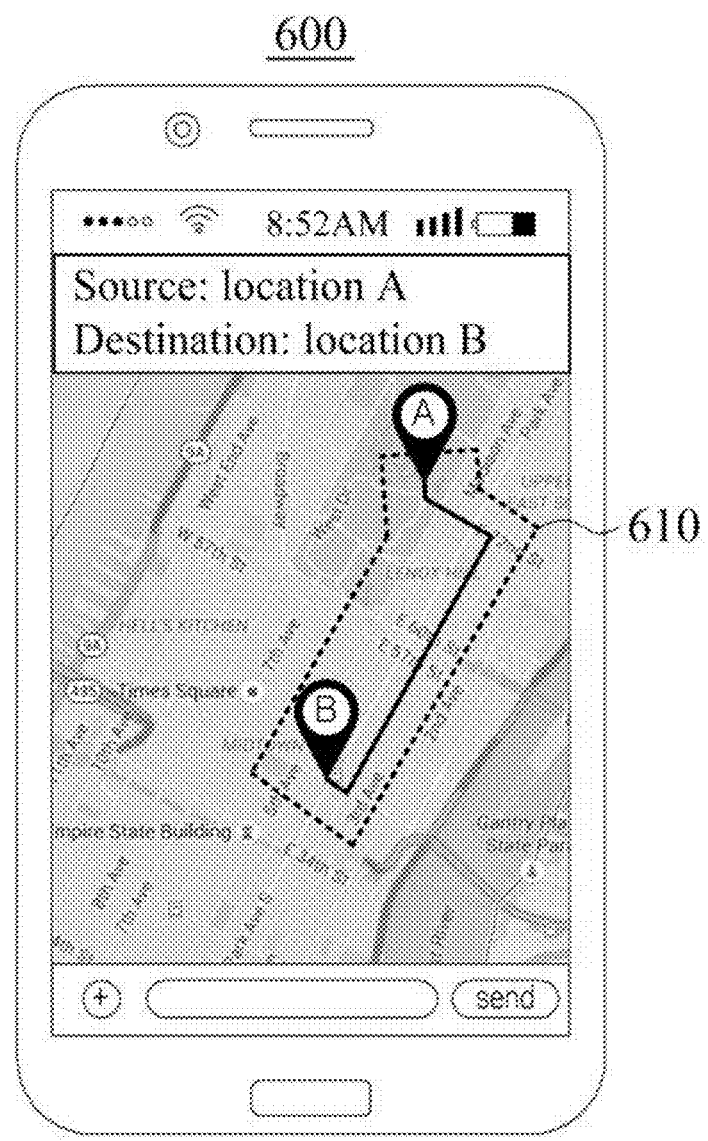
FIG. 6 is a screen illustrating a process of setting a location range using a source and a destination in an example embodiment of the inventive concepts.

FIG. 6 is a screen illustrating a process of setting a location range using a source and a destination in an example embodiment of the inventive concepts. A screen 600 of FIG. 6 may be a screen of a first electronic device and may illustrate one of routes from a source to a destination, which are set by a user of the first electronic device. In this case, the first electronic device may generate information about a location range based on the displayed route. For example, a range 610 of a dotted line displayed on the screen 600 may be a range set by the first electronic device to include the route from the source to the destination. The first electronic device may set a location range using the set range and a corresponding location on a map image. For example, the first electronic device may set a location range to include all of coordinates within a certain distance from coordinates on the route. For example, if a user of a second electronic device moves from the source and to the destination using a vehicle such as taxi, a server 150 of FIG. 2 may monitor whether the second electronic device moves along the route from the source to the destination. If the second electronic device deviates from the location range, the server 150 may determine that the second electronic device deviates from the route from the source to the destination and may send a notification message to the first electronic device.

In another example embodiment for setting a location range, the location range may include a location range for a route of a vehicle selected in the first electronic device. For example, the first electronic device may provide a user interface for selecting a route for each vehicle to its user. Also, the first electronic device may generate information about a location range for a route of a vehicle selected through the user interface.

Figure 7:
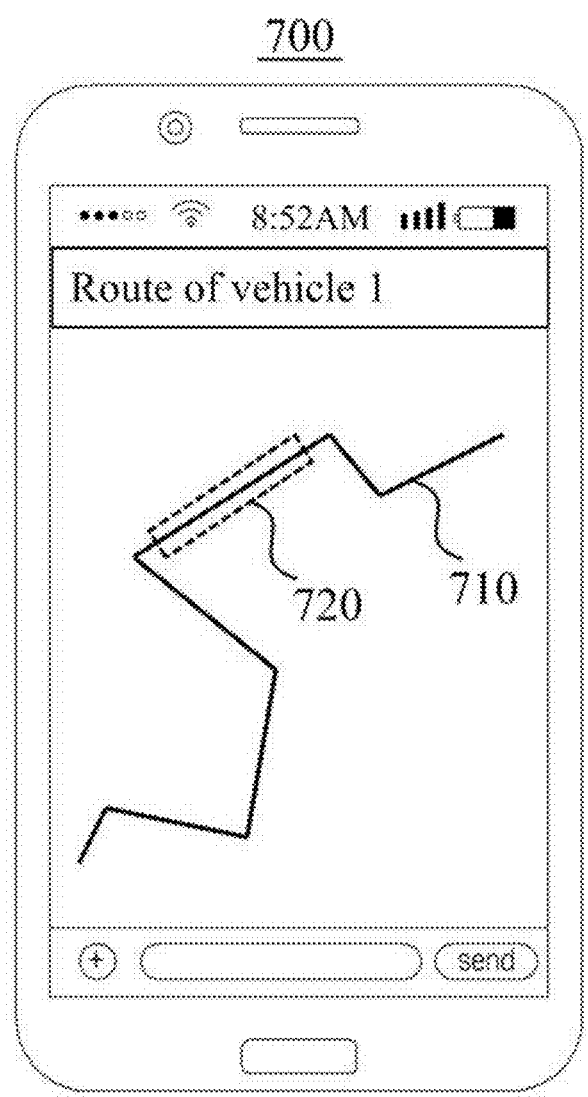
FIG. 7 is a screen illustrating a process of setting a location range using a route of a vehicle in an example embodiment of the inventive concepts.

FIG. 7 is a screen illustrating a process of setting a location range using a route of a vehicle in an example embodiment of the inventive concepts. In FIG. 7, a screen 700 may briefly display a route 710 of a vehicle 1 selected by a user of a first electronic device. The route 710 may be displayed on a map image. For example, in case of bus, the route 710 may be displayed together with bus stop information. In case of subway, the route 710 may be displayed together with subway station information. In this case, the first electronic device may set a location range for the entire selected route 710 or for a specific or select section of the route 710. A range of a dotted line on the screen 700 of FIG. 7 may indicate a location range set for a specific or select section (e.g., a section from a station A to a station B) of the route 710. For example, the first electronic device may set a location range using a location on the map image around a set range.

It may not be practical to set all of movement routes for one user as location ranges. Hereinafter, a description will be given of an example embodiment of sending a notification message if it is determined that an electronic device deviates from one location range and does not move into another location range. According to this example embodiment, the notification message will not be send, although the electronic device deviates from a location range, if the electronic device moves from one location range to another location range from among a plurality of location ranges.

For example, a location range may include a first location range and a second location range. In this case, a location monitoring controller 350 of FIG. 3 may control a server 150 of FIG. 2 to determine whether the first electronic device (or the second electronic device), which deviates from the first location range in a time corresponding to a time range, moves to a second location range. If it is determined that the first electronic device (or the second electronic device) does not move to the second location range, a message transmit controller 360 of FIG. 3 may control the server 150 to send a notification message to the second electronic device (or the first electronic device).

Figure 8:
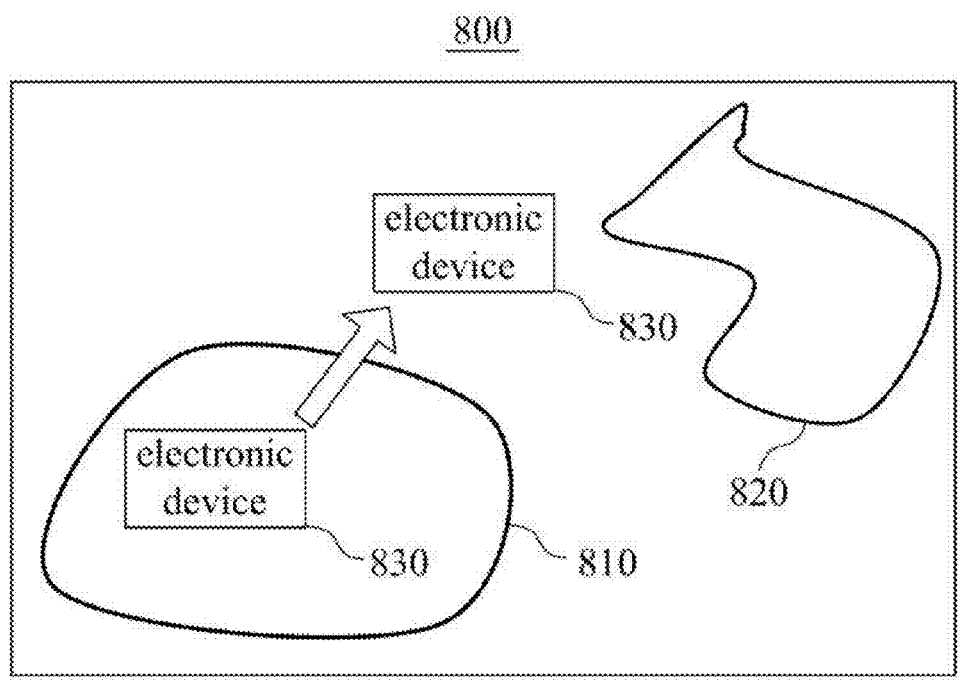
FIG. 8 is a drawing illustrating a plurality of location ranges in an example embodiment of the inventive concepts.

FIG. 8 is a drawing illustrating a plurality of location ranges in an example embodiment of the inventive concepts. In FIG. 8, a set first location range 810 and a set second location range 820 are briefly displayed on a map image 800. In this case, electronic device 830 located within the first location range 810 move out from the first location range 810. In this case, a server 150 of FIG. 2 may determine whether the electronic device 830 deviates from the first location range 810 and then moves into a second location range 820. For example, the server 150 may analyze a movement route of the electronic device 830, predict a subsequent route, and determine whether the electronic device 830 moves to the second location range 820 along the predicted route.

In this case, if it is determined that the electronic device 830 moves to the second location range 820, the server 150 may not send a notification message to another electronic device (not shown) merely based on the deviation of the first location range 810. In contrast, if it is determined that the electronic device 830 does not move to the second location range 820, the server 150 may send the notification message to the other electronic device.

Figure 9:
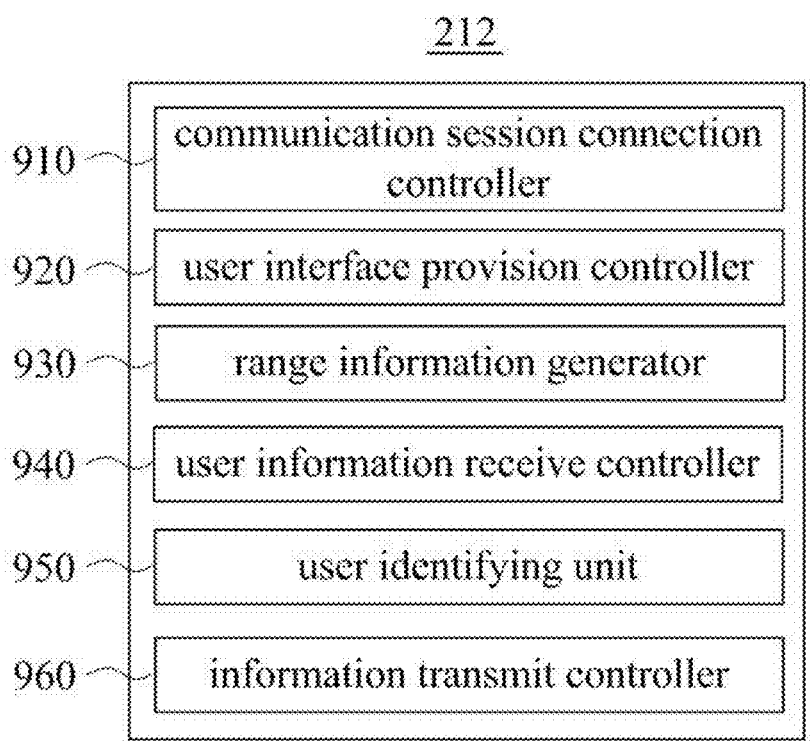
FIG. 9 is a block diagram illustrating a detailed configuration of a processor of an electronic device according to an example embodiment of the inventive concepts.
Figure 10:
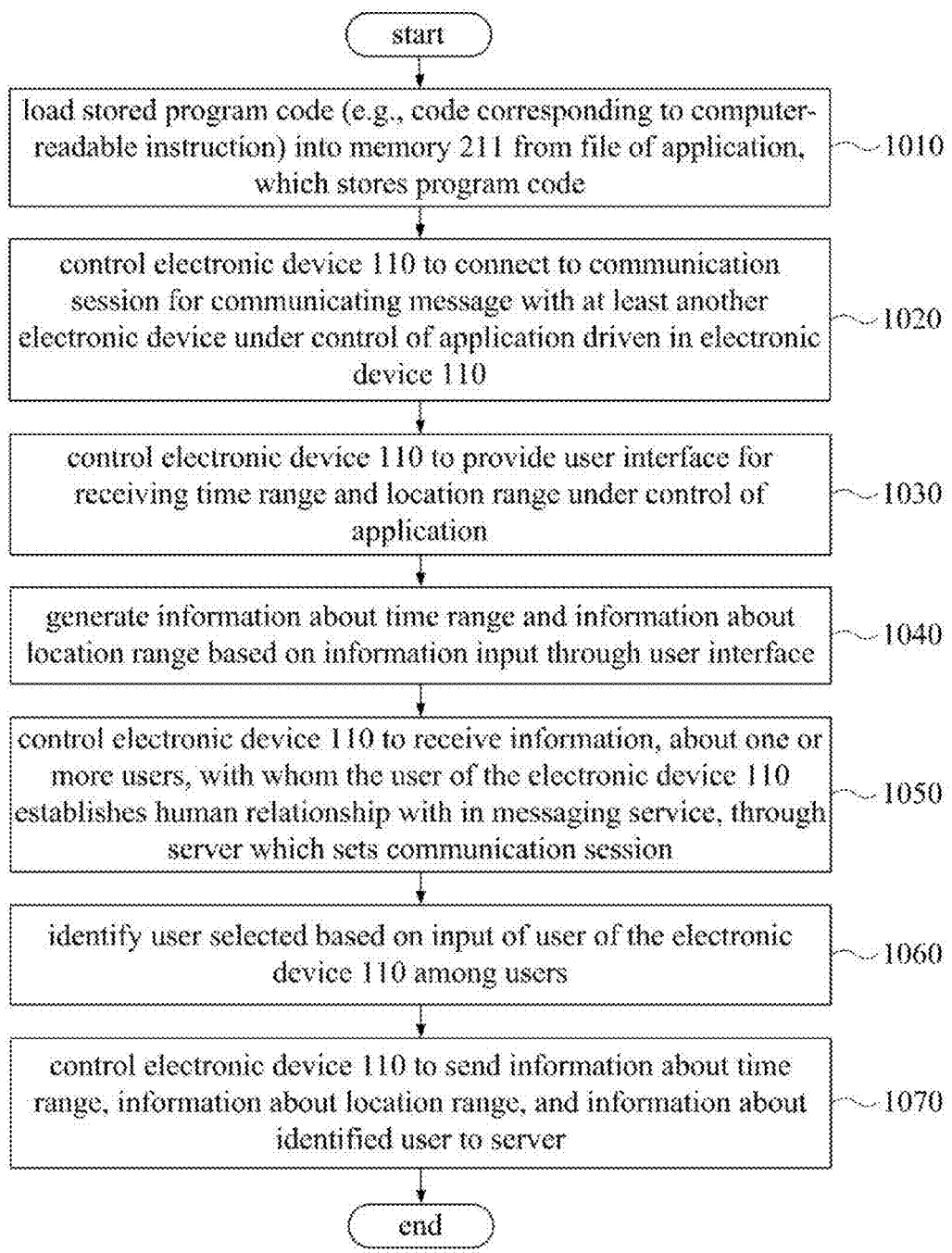
FIG. 10 is a flowchart illustrating a method performed by an electronic device according to an example embodiment of the inventive concepts.

FIG. 9 is a block diagram illustrating a detailed configuration of a processor of an electronic device according to an example embodiment of the inventive concepts. FIG. 10 is a flowchart illustrating a method performed by an electronic device according to an example embodiment of the inventive concepts. The electronic device according to these example embodiments may correspond to a first electronic device (e.g., the electronic device 110) described with reference to FIGS. 3 and 4.

As shown in FIG. 9, a processor 212 of the electronic device 110 may be configured (e.g., by software) to include a communication session connection controller 910, a user interface provision controller 920, a range information generator 930, a user information receive controller 940, a user identifying unit 950, and an information transmit controller 960. These components of the processor 212 may control the electronic device 110 to perform steps 1010 to 1070 included in a method of FIG. 10 and may be implemented to execute an OS and/or at least one program code included in a memory 211 of the electronic device 110 to perform this control. Herein, the at least one program code may be installed and driven in the electronic device 110, and may include a code of an application which provides a service of a server (e.g., a server 150 of FIG. 2) to the electronic device 110. This application may be the same as an application installed and driven in the electronic device 110.

In step 1010, the processor 212 may load a stored program code (e.g., a code corresponding to a computer-readable instruction) into a memory 211 of FIG. 2 from a file for installing an application, which stores a program code for performing the method of FIG. 10. For example, the application may be installed in the electronic device 110 through the file for installing the application. If the application installed in the electronic device 110 is driven, the processor 212 may load the program code stored in the file into the memory 211. In this case, each of the communication session connection controller 910, the user interface provision controller 920, the range information generator 930, the user information receive controller 940, the use identifying unit 950, and the information transmit controller 960 included in the processor 212 may execute a corresponding portion of the program code loaded into the memory 211 to execute subsequent steps 1020 and 1070. Thereafter, the processor 212 may control the other components of the electronic device 110. For example, the processor 212 may control a communication module 213 of FIG. 2 included in the electronic device 110 such that the electronic device 110 communicates data with the server 150 and/or other electronic devices.

In step 1020, the communication session connection controller 910 may control the electronic device 110 to connect to a communication session for communicating a message with at least another electronic device, under control of the application driven in the electronic device 110.

In step 1030, the user interface provision controller 920 may control the first electronic device 110 to provide a user interface for receiving a time range and/or a location range, under control of the application.

In step 1040, the range information generator 930 may generate information about the time range and/or information about the location range based on information input through the user interface.

For one example, in step 1030, the user interface provision controller 920 may control the electronic device 110 to display a map image on a screen of the electronic device 110. In this case, in step 1040, the range information generator 930 may generate information about a range set on the map image as the information about the location range, based on an input of a user of the electronic device 110 on the map image displayed on the screen. For example, the screen of the electronic device 110 may include a touch screen. In this case, the range information generator 930 may recognize a range set through a touch gesture of the user on the touch screen and set a range on the map image.

For another example, in step 1030, the user interface provision controller 920 may control the electronic device 110 to provide a user interface for setting a source and a destination. In this case, in step 1040, the range information generator 930 may generate information about a location range based on at least one route between a source and a destination set through the user interface.

For another example, in step 1030, the user interface provision controller 920 may control the electronic device 110 to provide a user interface for selecting a route for each vehicle. In this case, in step 1040, the range information generator 930 may generate information about a location range for a route of a vehicle selected through the user interface.

In step 1050, the user information receive controller 940 may control the electronic device 110 to receive information about one or more users, with whom the user of the electronic device 110 establishes a human relationship, in a messaging service through a server which establishes a communication session.

In step 1060, the user identifying unit 950 may identify a user selected based on an input of the user of the electronic device 110 among the users.

In step 1070, the information transmit controller 960 may control the electronic device 110 to send information about the time range, the information about the location range, and information about the identified user to the server.

In this case, the server may store the information about the time range and the information about the location range in a database of the server in connection with an identifier of the user of the electronic device 110 and an identifier of the identified user. Also, the server may monitor a location of the electronic device 110 (or an electronic device (e.g., an electronic device 120 of FIG. 1) of the identified user) based on information stored in the database. If the electronic device 110 (or the electronic device 120) deviates from a location range in a time corresponding to a time range, the server may send a notification message to the electronic device 120 (or the electronic device 110) through a communication session.

In another example embodiment, a location range may include a plurality of location ranges such as a first location range and a second location range. In this case, the server may determine whether the electronic device 110 (or the electronic device 120) which deviates from the first location range in the time corresponding to the time range moves into the second location range. If it is determined that the electronic device 110 (or the electronic device 120) does not move into the second location range, the server may send a notification message to the electronic device 120 (or the electronic device 110).

Contents omitted in FIGS. 9 and 10 may refer to contents described with reference to FIGS. 1 to 8.

As such, according to some example embodiments of the inventive concepts, users may easily and simply set a notification function based on the deviation of a location using a function of a messaging service by informing a first user of a location deviation of a second user (or second users), who is selected by the first user, using a human relationship of the messaging service. The system may detect deviation from various location ranges set based on various conditions, not deviation from a specific location or place, by providing a service to set a location range in various ways. Also, according to some example embodiments of the inventive concepts, the system may provide a more accurate message notification by additionally monitoring movement between set location ranges and providing a notification message if a user or a user terminal deviating from a first location range does not move into a second location range. If the user deviates from a location set by him or her, the system may mitigate or prevent a risk of the user by informing another user, with whom a human relationship is established, that the user deviates from the location set by him or her.

The foregoing devices may be realized by hardware, software, and/or combinations thereof. For example, the devices and components illustrated in the example embodiments of the inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concepts may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concepts or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concepts, or vice versa.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

According to an example embodiment, the system may allow users to easily and simply set a notification function based on a location deviation using a function of a messaging service by informing a first user of a location deviation of a second user (or second users) selected by the first user using a human relationship of the messaging service.

According to an example embodiment, the system may detect deviation from various location ranges set based on various conditions, not deviation from a specific or select location or place, by providing a service to set a location range in various ways.

According to an example embodiment, the system may provide a more accurate notification message by additionally monitoring movement between set location ranges and providing a notification message if there is no movement between the location ranges (meaning that a user or a user terminal deviating from a first location range does not move into a second location range).

According to an example embodiment, the system may mitigate or prevent a risk of the user by informing another user, with whom the user establishes a human relationship that the user deviates from a location range set by the user.

While some example embodiments have been particularly shown and described, it will be understood by one of ordinary skill in the art that variations in form and detail may be made therein without departing from the spirit and scope of the claims.

What is claimed is:

1. A server comprising:
   a memory configured to store computer-readable instructions; and
   at least one processor configured to execute the computer-readable instructions to, establish a communication session for routing messages between electronic devices and for managing human relationship information between users of the electronic devices, receive first information about a time range and second information about a location range from a first electronic device among the electronic devices, send third information to the first electronic device based on the human relationship information, the third information being information about one or more users with whom a user of the first electronic device establishes a human relationship, identify, from the first electronic device, a user selected among the one or more users, store the first information and the second information in a database in connection with an identifier of the user of the first electronic device and an identifier of the identified user, monitor a location of at least one of the first electronic device and a second electronic device of the identified user based on the first and second information stored in the database, and send, when one of the first electronic device or the second electronic device deviates from the location range at a time corresponding to the time range, a notification message to the other one of the first electronic device or the second electronic device through the communication session based on the monitored location.

2. The server of claim 1, wherein the location range is a range set on a map, based on an input of the user of the first electronic device on the map displayed on a screen of the first electronic device.

3. The server of claim 2, wherein:
the screen of the first electronic device is a touch screen; and
the range set on the map is set through a touch gesture of the user on the touch screen.

4. The server of claim 1, wherein the location range includes at least one route between a source and a destination set in the first electronic device.

5. The server of claim 1, wherein the location range includes a route of a vehicle selected in the first electronic device.

6. The server of claim 1, wherein:
the location range includes a first location range and a second location range; and
the at least one processor is configured to,
determine whether the one of the first electronic device or the second electronic device deviates from the first location range at the time corresponding to the time range and moves into the second location range, and
send the notification message to the other one of the first electronic device or the second electronic device, if it is determined that the one of the first electronic device or the second electronic device does not move into the second location range.

7. A method comprising:
establishing, by a first electronic device, a communication session for communicating a message with one or more other electronic devices;
providing, by the first electronic device, a user interface for receiving a time range and a location range;

generating, by the first electronic device, first information about the time range and second information about the location range based on information input through the user interface;

receiving, by the first electronic device, information about one or more users with whom a user of the first electronic device establishes a human relationship;

identifying, by the first electronic device, a user selected based on an input of the user of the first electronic device among the one or more users;

sending, by the first electronic device, the first information, the second information, and third information about the identified user to the server;

storing, in the server, the first and second information in connection with an identifier of the user of the first electronic device and an identifier of the identified user;

monitoring, by the server, a location of at least one of the first electronic device and a second electronic device of the identified user based on the first and second information stored in the database; and sending, by the server, a notification message to one of the first electronic device or the second electronic device through the communication session, when the other one of the first electronic device or the second electronic device deviates from the location range at a time corresponding to the time range.

8. The method of claim 7, wherein:
the user interface includes a map on a screen of the first electronic device; and
the generating generates the first information based on a range set on the map according to an input of the user of the first electronic device on the map.

9. The method of claim 8, wherein:
the screen of the first electronic device is a touch screen; and
the generating the first information comprises,
recognizing the range set through a touch gesture of the user of the first electronic device on the touch screen.

10. The method of claim 7, wherein:
the user interface enables the user of the first electronic device to set a source and a destination; and
the generating generates the first information based on at least one route between the source and the destination.

11. The method of claim 7, wherein:
the user interface enables the user of the first electronic device to select a route for each vehicle; and
the generating generates the first information based on the route of each vehicle selected through the user interface.

12. The method of claim 7, wherein:
the location range includes a first location range and a second location range; and
the sending the notification message comprises sending the notification message to the one of the first electronic device and the second electronic device if it is determined that the other one of the first electronic device or the second electronic device, which deviates from the first location range at a time corresponding to the time range, does not move to the second location range.

13. A non-transitory computer-readable recording medium storing computer-readable instructions, which when executed by a processor, cause the processor to perform the method of claim 7.

* * * * *